March 13, 1973 L. G. BOCKSTIE, JR 3,720,543
COATED POROUS CERAMIC ARTICLE AND METHOD OF MAKING
Filed April 12, 1971

INVENTOR.
Lawrence G. Bockstie, Jr.
BY
ATTORNEY

United States Patent Office 3,720,543
Patented Mar. 13, 1973

3,720,543
COATED POROUS CERAMIC ARTICLE AND METHOD OF MAKING
Lawrence G. Bockstie, Jr., Bradford, Pa., assignor to Corning Glass Works, Corning, N.Y.
Continuation-in-part of application Ser. No. 820,054, Apr. 29, 1969. This application Apr. 12, 1971, Ser. No. 133,228
Int. Cl. B44d 1/18; H01b 3/00
U.S. Cl. 117—218    18 Claims

ABSTRACT OF THE DISCLOSURE

A composition for coating a porous inorganic body to promote water repellency while maintaining its flameproof quality consisting essentially of an aromatic or aliphatic hydrogen polysiloxane and combinations thereof, and a volatile solvent. Upon application of the composition to such a body, the solvent rapidly evaporates while the polysiloxane cures leaving a nonablative ceramic-polysiloxane molecular complex on the entire surface of the porous body including the pore defining surfaces or walls without plugging the pores.

CROSS REFERENCE TO RELATED APPLICATION

This application is a continuation-in-part of application Ser. No. 820,054, filed Apr. 29, 1969, now abandoned.

BACKGROUND OF THE INVENTION

In the manufacture of porous ceramic coated articles such as resistors, for example, it has been suggested that various pore sealing materials such as a methyl silicone polymer be applied to the ceramic to obtain water repellency of the otherwise water permeable ceramic. It is important where relatively high temperature applications are contemplated, such as in electrical resistors coated with ceramic material, that the resulting coating and impregnant be flame and arc resistant.

The coatings and impregnants of the prior art are universally applied to porous materials in such a way as to clog or fill the pores. However, water vapor can permeate this pore filler material although at a relatively slow rate. Unfortunately, in high temperature environments, the entrapped vapor must diffuse back out of the ceramic through the pore filler material at a similarly slow rate. Often the overheat problem becomes excessive before a sufficient quantity of vapor previously accumulated in the impregnant filling the pores can agress therefrom.

In the prior art electrical resistors have been known to be coated with a porous ceramic which is in turn impregnated with a heavy coating of a hydrogen silicone polymer. In such cases the pores of the ceramic are completely filled with the polymer such that water vapor can diffuse relatively slowly therein and become entrapped near the resistive element. The accumulation of vapor near the resistive element is a relatively slow process because of the slow rate with which vapor diffusion through the polymer can occur. The application of power to the resistor causes heating of the resistive element which in turn tends to drive the accumulated water vapor back through the polymer filling the ceramic pores. Unfortunately, this reverse diffusion process is equally as slow as where the vapor diffuses into the resistor coating. As a result, should a severe overload be applied to the resistor causing a rapid overheat condition, the accumulated water vapor cannot often escape rapidly enough to avoid damaging the resistive element and permanently changing its resistance value. Water vapor trapped in the above-mentioned manner acts as an electrolyte by acquiring ions from the ceramic which thereafter can deleteriously affect the quality of the resistive element.

It is therefore an object of the present invention to provide a flame and/or water resistant coating and a method for forming such a coating which substantially overcomes the aforementioned difficulties. A more specific object is to provide a flame and water resistant coating for electrical components such as resistors.

SUMMARY OF THE INVENTION

Briefly, in accordance with the present invention, there is provided a composition for coating and impregnating porous inorganic bodies consisting essentially of from 1% to 95% by volume of an aromatic or aliphatic hydrogen polysiloxane, the remainder being a volatile solvent. The composition so provided can be applied to a porous inorganic material to form a nonablative layer over the entire surface of the porous material including the pore defining surfaces or walls, without plugging the pores.

Additional objects, features and advantages of the present invention will become apparent to those skilled in the art from the following detailed description and attached drawings on which, by way of example, only the preferred embodiments of the present invention are illustrated.

DESCRIPTION OF THE PREFERRED EMBODIMENTS

Figure 1:
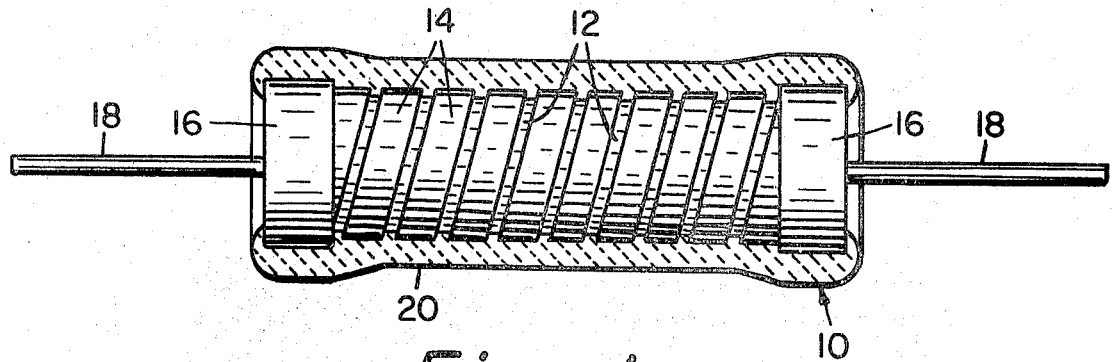
FIG. 1 shows a partially cross-sectioned view of a a typical ceramic coated metallic oxide thin film resistor known in the prior art.

The compositions, coatings, and methods of the present invention find utility in a number of different fields for forming flame retardant, water repellent coatings and impregnants on a variety of porous inorganic materials. Such coatings, for example, may be formed on a zinc-based paint of the type commonly used on boat hulls, structural steel, tanks, and the like. Also, such a coating and impregnant may be formed on porous ceramic materials. The composition may be adapted to provide either a high degree of water repellency, where flameproof properties are unimportant considerations, or the converse depending on the relative proportions of its individual ingredients. In what will probably be the more important case, however, the composition can be adapted to provide a high degree of both types of protection simultaneously.

I have found that my invention is well adapted to forming a protective coating and impregnant for porous ceramic coated electronic components or devices such for example as resistors, capacitors, inductors or the like. It is particularly suitable for use with thin film resistors. In addition to maintaining the ceramic coating in a flameproof condition as well as imparting a waterproof quality thereto, the present invention also substantially overcomes certain other difficulties commonly encountered with such thin film resistors. For example, those skilled in the art will understand that ceramic coated resistors coated with compositions of the prior art are often quite unstable in their electrical properties due to excessive changes in film resistivity that can occur as a result of moisture attack. The coatings of the present invention can be used to protect those portions of the resistive film that would otherwise be susceptible to attack by entrapped aqueous vapors, thereby enhancing resistor stability.

Another problem commonly encountered with such resistors is the tendency of certain ions contained in the ceramic, such as sodium ions, to become highly mobile in the presence of moisture, migrate out of the ceramic under the influence of an electric field, and attack the resistive film. The coating and impregnant formed by the present invention acts as a barrier with respect to such ions, confining them to the ceramic and thereby preserving the integrity of the resistive film. I have also found that ceramic resistor coatings impregnated with a polymer in accordance with this invention permit the intense heat often generated by severe overload currents to quickly drive the polymer out of the ceramic before it can ignite. This leaves only the molecules or atoms of the flameproof ceramic to react with the resistive film which reaction causes a non-conductive bridge to form across the film path thus opening the circuit in a fuse-like manner before combustion or explosive failure might otherwise occur. To better illustrate the special feature of this invention with respect to ceramic coated resistors, as well as to illustrate the more general features of waterproofing, the invention will now be described with respect to a specific porous ceramic coated resistor embodiment, although the present invention is in no way limited thereto.

Figure 2:
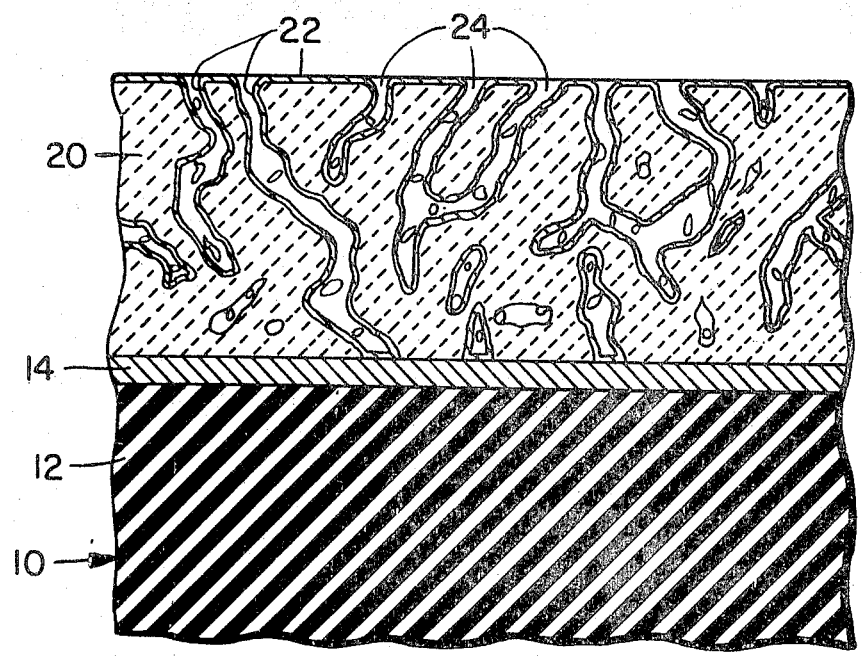
FIG. 2 is an enlarged diagrammatic cross-sectional illustration of a portion of a resistor such as that shown in FIG. 1 illustrating the structural nature of the poromeric coating and impregnant of the present invention.

Referring now to FIGS. 1 and 2 there is shown a cylindrically shaped thin film resistor 10 of the usual type having a dielectric substrate 12, a metallic oxide resistive film 14 forming a spiral path about substrate 12 and a pair of suitable terminal electrodes 16 to which are connected a pair of electrical lead wires 18. Film 14 may be formed of or contain tin oxide. The body of the resistor 10 is covered by any suitable cured porous ceramic coating 20 of preferably about 10 to 15 mils in average thickness although the thickness is not critical to the success of the present invention. A hydrogen polysiloxane layer 22 is shown in FIG. 2 applied over the surfaces of coating 20 including the pore defining surfaces thereof. The "poromeric" nature of layer 22, that is one which forms a thin protective layer about the walls of the pores 24 rather than filling them in as is the case with prior art silicone impregnants, is a unique feature of the present invention.

In accordance with the present invention layer 22 is formed by first providing a composition containing a suitable non-aqueous liquid hydrogen polysiloxane. Excellent results have been obtained employing methyl hydrogen polysiloxane (MHS) although other aromatic and aliphatic hydrogen polysiloxanes and combinations thereof such as ethyl hydrogen polysiloxane and propyl hydrogen polysiloxane may be used. The selected liquid polysiloxane is diluted with a volatile solvent which will readily evaporate from the composition as the polysiloxane is cured. There are a great variety of suitable commercially available solvents including acetone, methyl ethyl ketone, benzene, toluene, xylene, methanol, ethanol, isopropyl ether, trichloroethane, butyl acetate, ethyl acetate, naphtha, kerosine, dioxane, chlorobenzene, dimethyl sulfoxide mineral spirits, and many others. Depending upon the specific results desired, the composition may include from about 1% to 95% by volume of the selected hydrogen polysiloxane, the remainder being a suitable solvent. In general, it may be stated that the higher the concentration of hydrogen polysiloxane within this range, the higher will be the degree of waterproofing obtained as a result of applying the composition to a porous inorganic body. Conversely, the lower the concentration of hydrogen polysiloxane in the composition, the lower will be the degree of waterproofing, but the higher will be the flameproof character of the resultant impregnated porous ceramic coating.

The composition as prepared may now be applied to ceramic coating 20 by any suitable means such as by spraying, dipping, painting, or the like. A distinct advantage of this composition is that, where the ceramic coating 20 is not greater than about 50 mils in thickness, no special curing procedures need be employed. Layer 22 will slowly cure under ordinary ambient temperatures, pressures, humidity, and the like without the aid of additional heat or catalyst. It should be noted that both cured and uncured impregnants can be used in accordance with this invention. The important requirement in forming the impregnated coating is that sufficient application time be provided to permit the polysiloxane to thoroughly impregnate the ceramic coating. Where ceramic coating 20 is greater in thickness than about 50 mils it may be desirable to cure layer 22 by heating the impregnated coating on the resistor in the usual manner for effecting rapid cure of silicone type materials. Also, if desired, a catalyst such as zinc octoate may be added to the composition to promote curing. Ordinarily, however, such special curing measures are not necessary especially where the resulting coated body is permitted to cure at room temperature for an hour or so prior to initial use.

The unique poromeric character of layer 22 so formed serves several important purposes in the present example. First, layer 22 prevents aqueous liquid from permeating into pores 24 but readily permits the movement of aqueous vapor therein. In the prior art cases where polysiloxane silicones fill the pores of a ceramic coated resistor, aqueous vapor molecules could slowly diffuse deep into the pores. Unfortunately, the reverse process by which the vapor molecules would diffuse back out of the porous ceramic was equally as slow. Thus when the electric fields within the ceramic coated resistor would rise to a point where the load current in the resistor was high, the resistor would often fail because of thermal overload before the accumulated water vapor could escape from the porous ceramic through the polysiloxane filler. In the present case, however, any vapors accumulated within pores 24 will quickly egress without obstruction when the heat of the resistor 10 rises under heavily loaded conditions. One reason that layer 22 does not fill pores 24 is that, while it is curing following the application of the previously mentioned composition to ceramic coating 20, the solvent evaporates out through pores 24 thereby keeping them at least partially open. This is the major reason why resistor 10, so coated and impregnated, is not subject to destructive combustion or arcing.

It should also be noted that layer 22 is relatively continuous in character in its covering of the pore defining surfaces of ceramic coating 20, and the portions of film 14 exposed by pores 24. This permits layer 22 to act as a barrier confining the migration of the mobile ions of ceramic coating 20 when under the influence of an ion motivating electric field. Thus, any water vapor present in pores 24, which is ordinarily highly conducive to ion mobility, is effectively insulated from contact with such ions. Also, since film 14 is covered by layer 22 it is insulated from attack either by water vapor or migratory ions of ceramic coating 20.

Layer 22 adheres tenaciously to the surfaces of ceramic coating 20 and resistive film 14 because of the presence of highly active hydrogen atoms in the polysiloxane molecules of the layer composition. Even at room temperature these hydrogen atoms become reactive when the composition is applied to the ceramic coating. It is believed that this results in a chemical reaction whereby a ceramic-polysiloxane molecular complex is formed. For example, when a methyl hydrogen polysiloxane layer is to be applied to a porous silica, $SiO_2$, ceramic coating, hydrogen groups of the polysiloxane are oxidized to silanol groups (—OH). These in turn react with hydroxyl groups which occur on the substrate to form a molecular complex that becomes part of the substrate in the following manner.

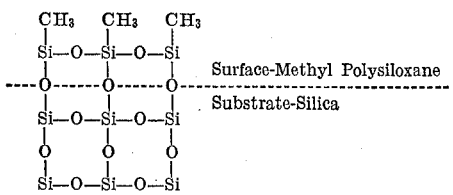

In preparing the composition from which layer 22 is formed, it has been found that the optimum degree of protection with respect to the water repellency and flameproofness is obtained by applying a composition containing about 33% by volume methyl hydrogen polysiloxane, MHS, the remainder being toluene or any other suitable volatile solvent such as one of those previously described. The stability of resistance values of resistors coated with such a composition was within ±1.0% resistance change as a result of a full load test conducted in a 100% relative humidity environment. By comparison, where no MHS impregnant was employed, resistor instability determined by the same full load humidity test resulted in a resistance change in the range of about ±60%. Also, ceramic resistors containing a pure polysiloxane impregnant wherein no volatile solvent was used changed resistance values by an average of about ±10% under the same test. Further, no combustion or ignition has been observed in resistors coated in accordance with this example of the invention, even under resistor overload tests wherein the resistor was overloaded by one hundred times rated power. In each such test, the polysiloxane molecules were rapidly driven off from the ceramic leaving the molecules or atoms of the ceramic alone to react with the resistive film to form a non-conductive bridge thereacross which opened the resistor in a fuse-like manner before fire or arcing could occur.

The following numbered examples illustrate coating composition ranges to produce certain preferred levels of resistor stability as well as flameproof and water repellent properties. It is to be understood that the following examples ae not limiting as to resistor or other applications, rather merely illustrative of compositions to achieve the particular end results within the limits specified therein. Obviously, one may desire different end properties, or such properties differing in degree or having different tolerance values.

EXAMPLE I

A conventional tin oxide thin film resistor was provided on which was disposed and cured by the usual well known techniques a porous ceramic coating having about 10 mils average thickness. The approximate composition of the ceramic as determined from its batch constituents is given in the Table I as a percent by weight of each constituent relative to a total batch weight of 100%.

Table I

| | Percent |
|---|---|
| Aluminum oxide | 52.5 |
| Silicon dioxide | 7.9 |
| Titanium dioxide | 11.1 |
| Bentone | 1.6 |
| Bluegreen stain | 5.2 |
| Prehydralized tetra ethyl orthosilicate | 15.8 |
| Methanol azeotrope of trimethyl borate | 1.2 |
| Isopropanol | 4.7 |

It was desired to determine the impregnating composition range over which a reasonable degree of moistureproofing could be obtained without regard to the flameproof quality thereof. Also, it was desired to maintain resistor stability within about a ±1.0% resistance change as a result of a full load test performed under 100% relative humidity conditions while passing rated D.C. power through the resistor. The resistance value of each resistor was measured before and after the load test to determine the percent change in resistance and hence its stability.

It was found that for low values of film resistivity, between 10 ohms and 1000 ohms, the impregnating composition could range from about 2% to 90% by volume of MHS, the remainder being toluene, an aromatic solvent, and permit the resultant coated resistor to meet the preselected ±1.0% resistance stability requirement. Resistors in the above stated resistivity range which were coated with a composition containing MHS outside of the 2% to 90% by volume range were usually somewhat outside the ±1.0% resistance stability test.

In a further test, resistors having a high level of film resistivity, in the range of from 1000 ohms to about 90,000 ohms, were coated with a composition containing varying amounts of MHS and were subjected to the same full load humidity test. The amount of MHS in the composition for which the resultant coated resistor could be maintained within the permissible ±1.0% resistor stability range for the present purposes was found to be anywhere from about 20% to 95% by volume of the total composition, the remainder being the same aromatic solvent.

EXAMPLE II

The same types of ceramic coated resistors as used in the previous example were provided. The porous ceramic coating on these resistors was impregnated with the composition of this invention containing varying amounts of MHS and were thereafter subjected to a severe overload test at one hundred times rated power to determine their fireproof properties. The degee of waterproofness of the resistors of this example was not considered as an important feature during this test although it was observed that excellent water repellent properties existed over the entire range tested.

It was found that for resistors in the low resistivity class, from 10 ohms to about 1000 ohms, absolutely no smoldering, burning, or arcing occurred where the impregnant composition applied to the porous ceramic coating contained MHS in the range of from about 1% to about 30% by volume, the remainder being a volatile solvent. Above this range, some tendency to arc, flash or burn was noted. However, for resistors in the higher resistivity class, from about 1000 ohms to about 90,000 ohms, the amount of MHS in the composition could range from about 1% up to about 75% by volume. Above this range, some tendency to arc, flash, or burn was noted. It was further noted that where the concentration of MHS was less than 1% by volume, the resulting layer 22 tended to be discontinuous. Such a discontinuous layer results from there being too small an amount of the polysiloxane in the impregnating composition to uniformly cover the extremely large surface area relative to the volume of the porous ceramic. Clearly such a nonuniform layer could not be expected to prevent ion attack on the tin oxide by confining the mobile ions of the ceramic, and for that reason such nonuniform layers are considered undesirable for ceramic coated resistor applications.

EXAMPLE III

Again, the same type of ceramic coated resistors as used in the previous examples were impregnated with the MHS-solvent composition using varying proportions of the two ingredients. The object was to determine the composition range over which the resistor impregnated therewith would exhibit a high degree of both flameproofness and waterproofness as well as maintain resistor stability within the previously specified ±1.0% resistance change limitation for moisture testing.

It was found that for the resistors of the previously mentioned low resistivity class, the amount of MHS in the composition prior to application could be varied from about 2% to 30% by volume, and meet the particular stated criteria. In the case of the high resistivity class of resistors, the amount of MHS could be varied from about 20% to 75% by volume of the total impregnating composition prior to its application and meet the same particular objectives.

It has been found that compositions varying from about 1% to about 95% by volume of methyl or ethyl hydrogen polysiloxane are suitable to achieve flame and/or moisture resistance for various applications and embodiments heretofore set out and which overcomes the disadvantages of the prior art. One familiar with the art can select the particular composition suitable for his needs in view of the foregoing teaching. The resulting protective layers formed on the porous ceramic coatings as well as the ceramic coatings themselves are nonablative, ablation as used herein is substantially defined by Hackh's Chemical Dictionary, 4th edition, as the gradual wearing of solid surfaces by hot gases at high speeds, e.g., of meteorites or long-range missiles entering the earth's atmosphere.

Although the present invention has been described with respect to specific details of certain embodiments thereof, it is not intended that such details limit the invention except insofar as set forth in the following claims.

I claim:

1. An article of manufacture comprising:
   a member,
   a porous ceramic body usably associated with said member, and
   a layer of material applied to the pore defining surfaces of said ceramic body in a substantially continuous manner, said material being selected from the group consisting of an aromatic hydrogen polysiloxane, an aliphatic hydrogen polysiloxane and combinations thereof, whereby a ceramic-polysiloxane molecular complex is formed on said pore defining surfaces, said layer having a thickness such that said body remains poromeric thereby permitting the passage of aqueous vapors while being aqueous-liquid impervious.

2. The article of manufacture of claim 1 wherein said ceramic-polysiloxane molecular complex is nonablative.

3. A porous body in accordance with claim 1 wherein said layer is selected from the group consisting of methyl hydrogen polysiloxane, ethyl hydrogen polysiloxane and propyl hydrogen polysiloxane.

4. The article of manufacture of claim 1 wherein said porous ceramic body is nonablative.

5. A coated electrical device comprising:
   an electrical component,
   a porous ceramic coating disposed over said component, and
   a layer of material applied to the pore defining surfaces of said porous ceramic coating, said material being selected from the group consisting of an aromatic hydrogen polyisiloxane, an aliphatic hydrogen polysiloxane and combinations thereof, said layer of material forming a substantially continuous ceramic-polysiloxane molecular complex on the pore defining surfaces of said coating while permitting said pores to remain open, whereby said coating is aqueous-liquid-impervious and aqueous-vapor-permeable.

6. The device of claim 5 wherein said ceramic-polysiloxane molecular complex is nonablative.

7. The device of claim 5 wherein said porous ceramic coating is nonablative.

8. The device of claim 5 wherein said component is a resistive element.

9. In combination with an electrical resistor of the type having
   a dielectric substrate,
   an electroconductive resistive layer disposed on said substrate, and
   a porous ceramic coating disposed over said resistive layer,
   the improvement comprising
   a layer of material applied to the pore defining surfaces of said porous ceramic coating, said material being selected from the group consisting of an aromatic hydrogen polysiloxane, an aliphatic hydrogen polysiloxane and combinations thereof, said layer of material forming a substantially continuous ceramic-polysiloxane molecular complex on the pore defining surfaces of said coating while permitting said pores to remain open, whereby said coating is aqueous-liquid-impervious and aqueous-vapor-permeable.

10. The combination of claim 9 wherein said ceramic-polysiloxane molecular complex is nonablative.

11. The combination of claim 10 wherein said porous ceramic coating is nonablative.

12. A porous body in accordance with claim 9 wherein said layer of material is selected from the group consisting of methyl hydrogen polysiloxane, ethyl hydrogen polysiloxane and propyl hydrogen polysiloxane.

13. A method of making an article of manufacture comprising the steps of
   mixing a non-aqueous solution of from about 1% to 95% by volume of an impregnating material selected from the group consisting of an aromatic hydrogen polysiloxane, an aliphatic hydrogen polysiloxane, and mixtures thereof, and a volatile solvent,
   applying said solution to a body of porous ceramic material, and
   curing said solution to evaporate said solvent through said pores and to cause a reaction between said impregnating material and said ceramic material to form a ceramic-polysiloxane molecular complex on the pore defining surfaces of said body of porous ceramic material, whereby said body is aqueous-liquid impervious while said pores remain open.

14. The method of claim 13 wherein said reaction between said impregnating material and said ceramic material forms a nonablative ceramic-polysiloxane molecular complex.

15. A method of making a porous ceramic-coated, moisture-proof resistor comprising the steps of
   mixing a non-aqueous solution of from about 2% to 95% by volume of an impregnating material selected from the group consisting of an aromatic hydrogen polysiloxane, an aliphatic hydrogen polysiloxane, and mixtures thereof, and a volatile solvent,
   applying said solution to the porous ceramic coating of said resistor so that said solution substantially completely covers the pore defining surfaces of said porous ceramic coating, and
   curing said solution to evaporate said solvent through said pores and to cause a reaction between said impregnating material and said porous ceramic coating to form a ceramic polysiloxane molecular complex on said pore defining surfaces while permitting said pores to remain open.

16. A method of making a porous ceramic coated, waterproof and fireproof resistor comprising the steps of
   mixing a non-aqueous solution of from about 1% to 75% by volume of an impregnating material selected from the group consisting of an aromatic hydrogen polysiloxane, an aliphatic hydrogen polysiloxane, and mixtures thereof, and a volatile solvent,
   applying said solution to the porous ceramic coating of said resistor, so that said solution substantially completely covers the pore defining surfaces of said porous ceramic coating, and
   curing said solution to evaporate said solvent through said pores and to cause a reaction between said impregnating material and said porous ceramic coating to form a ceramic-polysiloxane molecular complex on said pore defining surfaces while permitting said pores to remain open.

17. The method of claim 16 wherein the step of mixing comprises mixing a non-aqueous solution of from about 2% to 75% by volume of an impregnating material selected from the group consisting of an aromatic hydrogen polysiloxane, an aliphatic hydrogen polysiloxane and mixtures thereof, and a volatile solvent.

18. The method of claim 17 wherein said reaction between said impregnating material and said porous ceramic coating forms a nonablative ceramic-polysiloxane molecular complex.

References Cited

UNITED STATES PATENTS

| | | | |
|---|---|---|---|
| 3,395,035 | 7/1968 | Strauss | 117—72 |
| 3,048,914 | 8/1962 | Kohring | 117—218 |

RALPH HUSACK, Primary Examiner

U.S. Cl. X.R.

117—70 A, 72, 98, 123 D, 135.5, 137, 161ZA; 338—257, 262